United States Patent [19]

Inagaki et al.

[11] Patent Number: 5,693,390

[45] Date of Patent: Dec. 2, 1997

[54] SURFACE-COATED VESSEL AND PROCESS FOR PRODUCING SAME

[75] Inventors: Hajime Inagaki, Iwakuni; Koji Yoshii, Hiroshima, both of Japan

[73] Assignee: Mitsui Petrochemical Industries, Ltd., Tokyo, Japan

[21] Appl. No.: 716,429

[22] PCT Filed: Jan. 29, 1996

[86] PCT No.: PCT/JP96/00163

§ 371 Date: Sep. 20, 1996

§ 102(e) Date: Sep. 20, 1996

[87] PCT Pub. No.: WO96/23842

PCT Pub. Date: Aug. 8, 1996

[30] Foreign Application Priority Data

Feb. 1, 1995 [JP] Japan ................................. 7-015454
Feb. 1, 1995 [JP] Japan ................................. 7-015455

[51] Int. Cl.$^6$ .............................. B29D 22/00; C08F 2/50
[52] U.S. Cl. ...................... 428/35.7; 427/517; 427/519; 522/16
[58] Field of Search ..................... 522/16; 427/517, 427/519, 425; 428/35.7

[56] References Cited

U.S. PATENT DOCUMENTS

| | | | |
|---|---|---|---|
| 4,515,836 | 5/1985 | Cobbs, Jr. et al. | 427/425 |
| 4,526,920 | 7/1985 | Sakashita et al. | |
| 4,569,869 | 2/1986 | Kushida et al. | 428/35 |
| 5,145,885 | 9/1992 | Berner et al. | 522/39 |

FOREIGN PATENT DOCUMENTS

| | | |
|---|---|---|
| 59-25840 | 8/1982 | Japan. |
| 60-7931 | 6/1983 | Japan. |
| 4285601 | 3/1991 | Japan. |

*Primary Examiner*—George F. Lesmes
*Assistant Examiner*—Cheryl Juska
*Attorney, Agent, or Firm*—Birch, Stewart, Kolasch & Birch, LLP

[57] ABSTRACT

A surface-coated vessel or a surface-coated product having a hard coating layer is obtained, by coating a substrate of, for example, resin product with a resin composition for hard coating which comprises (a) a poly[(meth)acryloyloxyalkyl](iso)cyanurate represented by the following general formula (1) or (2):

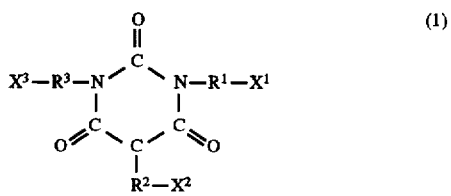

(1)

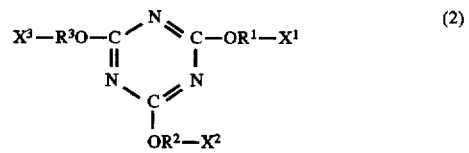

(2)

wherein $X^1$, $X^2$ and $X^3$ are each an acryloyl group, methacryloyl group, hydrogen atom or an alkyl group, with a proviso that at least two of them are (meth)acryloyl groups, and $R^1$, $R^2$ and $R^3$ are each an oxyalkylene group or a polyoxyalkylene group;

(b) a poly(meth)acrylated polyoxyalkane polyol;
(c) a photopolymerization initiator consisting of 2-methyl-1-[4-(methylthio)phenyl]-2-morpholino-1-propanone;
(d) a photopolymerization initiator based on thioxanthone;
(e) a UV-absorber based on monohydroxybenzophenone;
(f) an organic solvent.

Such surface-coated products and vessels have a hard coat which is more excellent than that of the prior art especially in the curing characteristics, such as the rate of curing etc., as well as in the coating properties, such as surface hardness, fastness to scratch and abrasion, flexibility, surface gloss, heat resistance, fastness to solvents and to alkali, weather resistance and tight adhesion onto substrates, so that they can constitute reclamable coated products in a form of, for example, returnable bottles.

12 Claims, No Drawings

SURFACE-COATED VESSEL AND PROCESS FOR PRODUCING SAME

This application is a 371 of PCT/JP96/00163 filed Jan. 29, 1996.

FIELD OF THE INVENTION

The present invention relates to a resin composition for hard coating for producing a hard coat on a substrate, such as a resin molded product, to coated products with such a hard coat, to a surface-coated vessel made of a resin based on polyester on which such a hard coat is formed and to a process for producing the surface-coated vessel. In particular, the present invention relates to a resin composition for hard coating which can afford to build up a hard coat exhibiting superior properties, such as surface hardness, resistance to scratch, abrasion resistance, flexibility, surface gloss, heat resistance, water resistance, resistance to solvent, resistance to alkali, weather resistance and tight adhesion, to coated products, to a surface-coated vessel, such as a returnable bottle intended for reuse, and to a process for producing such a surface-coated vessel.

BACKGROUND OF THE INVENTION

Resin molded articles made of a thermoplastic resin or a thermosetting resin are not only superior in the impact strength with light-weighing but also possessed of various advantages, such as low costs and ease in the production, as compared with products of metals and glasses, so that they are used widely in the place of metal and glass products in various fields including parts and accessories of automobile and autocycle, domestic electrified products and household goods of daily use. However, resin molded articles have, in general, lower surface hardness and are subject to damage by scratch and abrasion leaving surface flaws, as compared with products of metals and glass.

Vessels of resins based on polyester, such as polyethylene terephthalate (PET), are not only low-priced and easy in their production, but also light weighing and superior in the impact strength and in impermeability for gases and can be processed easily by, for example, molding etc., so that they are now in wide use for vessels of food products, such as drink bottles. However, vessels of a resin based on polyester exhibit lower surface hardness and lower resistance against scratch and abrasion, leaving easily surface flaws, as compared with vessels made of metals and glass.

For remedying these disadvantages, a technique has been incorporated in order to improve the material properties, such as surface hardness etc., of resin products, in which the surface of the resin substrate is provided with a hard coat. As a resin composition for hard coating of this kind in the prior art, Japanese Patent Kokai Sho 59-25840 proposes a resin composition comprising a poly[(meth)acryloyloxyalkyl](iso)cyanurate, a poly(meth)acrylated polyoxyalkanepolyol, a photopolymerization initiator, for example, 1-(4-isopropylphenyl)-2-hydroxy-2-methyl-1-propanone, and an inorganic filler, such as silica powder.

When a resin molded product is coated with such a resin composition for hard coating and a hard coat is produced on the resin substrate of the molded product, the hardening characteristic upon the curing of the coating layer in the air is excellent and the resulting hard coat exhibits superior coating properties, such as surface hardness, resistance to scratch and abrasion, flexibility, surface gloss, heat resistance, water resistance, resistance to solvents, weather resistance and tight adhesion on the substrate. In some cases, however, there is a further requirement in accordance with the specific use of the product that a hard coat exhibiting excellent coating properties, in particular, with respect to the surface hardness, resistance to alkali and so on is obtained. Especially, when a surface-coated vessel is used for a returnable vessel, such as returnable bottle, improved coating properties, such as surface hardness and weather resistance, are requested so as to meet the condition for collecting and reclamative processing thereof including washing procedure for preparing for reuse of the used-up and collected vessel, in addition to a higher resistance to alkali so as to withstand the alkali washing condition.

An object of the present invention is to provide a resin composition for hard coating capable of building up a hard coat on substrates which is superior, as compared with that of the prior art, in coating properties, such as surface hardness, resistance to scratch, abrasion resistance, flexibility, surface gloss, heat resistance, water resistance, fastness to solvents and to alkali, weather resistance and tight adhesion on the substrate as well as in the curing characteristics, such as the rate of curing in the air, when the resin composition is coated on a substrate of, for example, a resin molded product, and caused to build up a hard coat.

Another object of the present invention is to provide coated products, in particular, surface-coated vessels having a hard coat which is more superior in the coating properties, such as surface hardness, resistance to scratch, abrasion resistance, flexibility, surface gloss, heat resistance, water resistance, resistance to alkali and to solvents, weather resistance and tight adhesion on substrates, as compared with those of the prior art.

A further object of the present invention is to propose a process for producing surface-coated vessels which permits to produce surface-coated vessels such as mentioned above in an efficient manner without causing any deformation of the substrate vessel of a resin based on polyester and which will result in a hard coat with superior curing characteristics, such as the rate of curing of the coated layer of the resin composition for hard coating upon curing in the air.

DISCLOSURE OF THE INVENTION

The resin composition for hard coating according to the present invention comprises (a) a poly[(meth)acryloyloxyalkyl](iso)cyanurate represented by the following general formula (1) or (2):

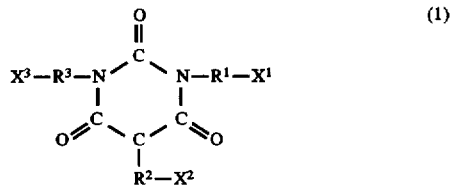

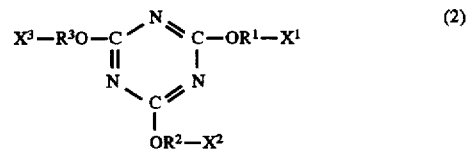

wherein $X^1$, $X^2$ and $X^3$ represent each an acryloyl group, methacryloyl group, hydrogen atom or an alkyl group, with a proviso that at least two of them are (meth)acryloyl groups, and $R^1$, $R^2$ and $R^3$ represent each an oxyalkylene group or a polyoxyalkylene group;

(b) a poly(meth)acrylated polyoxyalkane polyol having in the molecule at least one ether bond and at least three hydroxy groups, in a content in the range from 5 to 300 parts per 100 parts by weight of said component (a);

(c) a photopolymerization initiator consisting of 2-methyl-1-[4-(methylthio)phenyl]-2-morpholino-1-propanone in a content in the range from 0.01 to 20 parts per 100 parts by weight of the sum of the above two components (a) and (b);

(d) a further photopolymerization initiator based on thioxanthone in a content in the range from 0.001 to 5 parts per 100 parts by weight of the sum of the components (a) and (b);

(e) a UV-absorber based on monohydroxybenzophenone in a content in the range from 0.01 to 20 parts per 100 parts by weight of the sum of the components (a) and (b); and (f) an organic solvent in a content in the range from 5 to 3,000 parts per 100 parts by weight of the sum of the components (a) and (b).

The coated products according to the present invention have on the resin substrate a hard coat obtained from the resin composition for hard coating defined as above.

The surface-coated vessel according to the present invention have, formed over the outer surface of the vessel made of a resin based on polyester, a hard coat obtained from the resin composition for hard coating defined above.

The process for producing a surface-coated vessel according to the present invention comprises a process step of coating the outer surface of a vessel made of a resin based on polyester with a resin composition for hard coating defined above.

In the context of this patent application, by the expression "(meth)acryl", "acryl and/or methacryl" is meant and, by "(iso)cyanurate", "isocyanurate and/or cyanurate" is meant.

In the resin composition for hard coating according to the present invention, it is meant by "a poly[(meth) acryloyloxyalkyl](iso)cyanurate" of the component (a) a poly[(meth)acryloyloxyalkyl]isocyanurate represented by the general formula (1) given above or a poly[(meth) acryloyloxyalkyl]cyanurate represented by the general formula (2) given above.

The poly[(meth)acryloyloxyalkyl](iso)cyanurate may be a tris[(meth)acryloyloxyalkyl](iso)cyanurate or a bis[(meth) acryloyloxyalkyl](iso)cyanurate or, further, a mixture of these compounds, though a mixture having a predominant proportion of tris[(meth)acryloyloxyalkyl]isocyanurate is preferred.

In the general formulae (1) and (2), the alkyl for the radicals $X^1$, $X^2$ and $X^3$ may usually be an alkyl group having 1–4 carbon atoms. The radical $R^1$, $R^2$ or $R^3$ may stand for an oxyalkylene group having 1–12, preferably 2–4 carbon atoms or for a polymer, usually a 2- to 12-mer, preferably a 2- to 4-mer, of such an oxyalkylene group.

For the poly[(meth)acryloyloxyalkyl]isocyanurate represented by the general formula (1), there may be enumerated, for example, tris(acryloyloxyethyl)isocyanurate, tris (methacryloyloxyethyl)isocyanurate, tris(2-acryloyloxypropyl)isocyanurate, tris(2-methacryloyloxypropyl)isocyanurate, bis(acryloyloxyethyl) hydroxyethyl isocyanurate, bis(methacryloyloxyethyl) methoxyethyl isocyanurate, bis(2-acryloyloxypropyl)-2-hydroxypropyl isocyanurate, bis(2-methacryloyloxypropyl)-2-hydroxypropyl isocyanurate, tris[acryloyldi(oxyethylene)]isocyanurate and tris [methacryloyldi(oxyethylene)]isocyanurate. It is also possible to use a mixture of two or more of these oligomers.

For the poly[(meth)acryloyloxyalkyl]cyanurate represented by the general formula (2), there may be enumerated, for example, tris(acryloyloxyethyl)cyanurate, tris (methacryloyloxyethyl)cyanurate, tris(2-acryloyloxypropyl) cyanurate, tris(2-methacryloyloxypropyl)cyanurate, bis (acryloyloxyethyl)hydroxyethyl cyanurate, bis (methacryloyloxyethyl)methoxyethyl cyanurate, bis(2-acryloyloxypropyl)-2-ethoxypropyl cyanurate, bis(2-methacryloyloxypropyl)-2-hydroxypropyl cyanurate, tris [acryloyldi(oxyethylene)]cyanurate and tris[methacryloyldi (oxyethylene)]cyanurate. It is also possible to use a mixture of two or more of these oligomers.

Among the above oligomers, preferable one is tris (acryloyloxyethyl)isocyanurate.

The poly(meth)acrylated polyoxyalkanepolyol to be incorporated in the resin composition for hard coating according to the present invention as the component (b) is a poly(meth)acrylated polyoxyalkanepolyol having in the molecule at least one ether bond and at least three hydroxy groups and has in the molecule at least three acryloyloxy or methacryloyloxy groups, wherein a presence of hydroxy group is permissible in some cases.

The polyoxyalkanepolyol constituting the poly(meth) acrylated polyoxyalkanepolyol of the component (b) has at least one ether bond and at least three hydroxy groups. This polyoxyalkanepolyol is formed by a condensation of at least one mole of an alkanepolyol having three or more hydroxy groups with at least one mole of an alkanepolyol having two or more hydroxy groups and has at least one ether bond.

As the polyoxyalkanepolyol, there may be exemplified diglycerol, triglycerol, tetraglycerol, dipentaglycerol, ditrimethylolpropane, tritrimethylolpropane, tetratrimethylolpropane, dipentaerythritol and tripentaerythritol.

The poly(meth)acrylated polyoxyalkanepolyol of the component (b) has in the molecule usually 1–3, preferably 1–2 ether bonds and 3 –10, preferably 3–8 acryloyloxy or methacryloyloxy groups, wherein the molecular weight thereof is usually in the range from 240 to 3,000, preferably from 240 to 1,000.

Concrete examples of the poly(meth)acrylated polyoxyalkanepolyol of the component (b) are diglycerol triacrylate, diglycerol trimethacrylate, diglycerol tetraacrylate, diglycerol tetramethacrylate, ditrimethylolpropane triacrylate, ditrimethylolpropane tetraacrylate, ditrimethylolpropane tetramethacrylate, tritrimethylolpropane triacrylate, tritrimethylolpropane trimethacrylate, tritrimethylolpropane pentaacrylate, dipentaerythritol triacrylate, dipentaerythritol trimethacrylate, dipentaerythritol tetraacryacrylate, dipentaerythritol tetramethacrylate, dipentaerythritol pentaacrylate, dipentaerythritol pentamethacrylate, dipentaerythritol hexaacrylate and dipentaerythritol hexamethacrylate. These poly(meth)acrylated polyoxyalkanepolyols may be used either solely or in a mixture of two or more of them. Among them, preference is given to dipentaerythritol hexaacrylate.

The weight proportion of the poly(meth)acrylated polyoxyalkanepolyol of the component (b) in the resin composition is in the range from 5 to 300, preferably from 10 to 150 phr (part per 100 parts) by weight of the poly[(meth) acryloyloxyalkyl](iso)cyanurate of the component (a). If the weight proportion of the poly(meth)acrylated polyoxyalkanepolyol (b) is more than 300 phr by weight of the poly[(meth)acryloyloxyalkyl](iso)cyanurate, problems may be brought about in that the flexibility of the resulting hard coat becomes lower and cracks may appear in the coating layer.

While the film-forming component (namely, the polymerizable monomer content) in the resin composition for hard coating according to the present invention may be constituted only of the components (a) and (b), it is possible to incorporate therein further polymerizable monomer component(s) to copolymerize with them. For the further polymerizable components, there may be employed, for example, the by-products and the intermediates occurring upon the production of the poly[(meth)acryloyloxyalkyl] (iso)cyanurate of the component (a), such as mono[(meth) acryloyloxyalkyl]bis(hydroxyalkyl) (iso)cyanurate, the by-products and the intermediates occurring upon the production of the poly(meth)acrylated polyoxyalkanepolyol of the component (b), such as mono(meth)acrylate or di(meth) acrylate of a polyoxyalkanepolyol, and (meth)acrylic acid esters, such as methyl(meth)acrylate, ethyl (meth)acrylate and 2-hydroxyethyl(meth)acrylate.

In the resin composition for hard coating according to the present invention, a combination of photopolymerization initiators is incorporated in order to initiate polymerization and cross linking of the film-forming component in the coated layer on a substrate. As the photopolymerization initiators, 2-methyl-1-[4-(methylthio)phenyl]-2-morpholino-1-propanone (MMPMP) as the component (c) and an initiator based on thioxanthone as the component (d) are employed in combination.

For the photopolymerization initiator based on thioxanthone of the component (d), for example, 2,4-diethylthioxanthone, 2,4-dimethylthioxanthone and 2-chlorothioxanthone are enumerated. They may be used either alone or in a mixture of two or more of them.

The amount of MMPMP of the component (c) in the resin composition is chosen in the range from 0.01 to 20, preferably from 0.05 to 10 phr by weight of the sum of the components (a) and (b). If the content of MMPMP is less than 0.01 phr by weight of (a)+(b), the curing of the coated film becomes insufficient and, if the content of MMPMP is more than 20 phr by weight, the curing of the coated film proceeds excessively to cause crack formation and a brownish coloration.

The amount of the photopolymerization initiator based on thioxanthone of the component (d) in the resin composition according to the present invention is chosen in the range from 0.001 to 5 phr by weight, preferably from 0.01 to 3 phr by weight of the components (a)+(b). If this amount is less than 0.001 phr by weight, the curing of the coated film becomes insufficient and, if this amount is more than 5 phr by weight of (a)+(b), a considerable yellowing of the coated film occurs together with a decrease in the surface hardness.

In the resin composition for hard coating according to the present invention, an ultraviolet ray absorber based on monohydroxybenzophenone is included as the component (e). For the UV-absorber based on monohydroxybenzophenone, there may be enumerated for example, 2-hydroxy-4-methoxybenzophenone, 2-hydroxy-4-methoxy-2'-carboxybenzophenone, 2-hydroxy-4-octoxybenzophenone, 2-hydroxy-4-stearoxybenzophenone, 4-dodecyloxy-2-hydroxybenzophenone, 2-hydroxy-4-methoxy-5-sulfobenzophenone trihydrate, 2-hydroxy-4-methoxybenzophenone-5-sulfonic acid and 2-hydroxy-4-(2-hydroxy-3-methacryloxy)propoxybenzophenone. They may be employed each solely or in a mixture of two or more of them.

The amount of the UV-absorber based on monohydroxybenzophenone in the resin composition according to the present invention is chosen within the range from 0.01 to 20, preferably from 0.03 to 10 phr by weight of the components (a)+(b). If this amount is less than 0.01 phr by weight, distinct coloration of the coated film occurs together with an insufficient improvement of the weather resistance of the substrate and, if this amount is more than 20 phr by weight, the curing of the coated film becomes insufficient.

In the resin composition for hard coating according to the present invention, an organic solvent is included as the component (f) in order to increase the workability for the application work to maintain the resin composition in a dissolved or suspended state. The organic solvent can also serve for bringing the solid components of the resin composition into a state of liquid or suspension, for adjusting the viscosity of the resin composition according to the present invention and for improving the wettability of the substrate surface against the coated film of the resin composition. As the organic solvent of the component (f), there may be enumerated, for example, hydrocarbons, such as benzene, toluene, xylene, cumene, ethylbenzene, hexane, heptane, octane, petroleum ether, ligroin, cyclohexane and methyl cyclohexane; halogenated hydrocarbons, such as methylene chloride, chloroform, carbon tetrachloride, bromoform, dichloroethylene, trichloroethylene, perchloroethylene, trichloroethane, tetrachloroethene, dichloropropylene, chlorobenzene and bromobenzene; alcohols, such as methanol, ethanol, isopropanol, butanol, pentanol, hexanol, cyclohexanol, ethylene glycol, propylene glycol, glycerin, ethylene glycol monomethyl ether and diethylene glycol; ketones, such as acetone, methyl ethyl ketone, methyl isobutyl ketone and cyclohexanone; ethers, such as diethyl ether, dipropyl ether, butyl ethyl ether, dibutyl ether, ethylene glycol dimethyl ether and diethylene glycol dimethyl ether; nitriles, such as acetonitrile, propionitrile and capronitrile; and esters, such as methyl formate, ethyl formate, methyl acetate, ethyl acetate, propyl acetate, isobutyl acetate, butyl acetate, pentyl acetate, methyl benzoate and ethyl benzoate. They are employed each solely or in a mixture of two or more of them.

The amount of the organic solvent of the component (f) in the resin composition is chosen in the range from 5 to 3,000, preferably from 10 to 2,000 phr by weight of the sum of the components (a) and (b).

While the resin composition for hard coating according to the present invention may be composed of only the above essential components (a) to (f), it is possible, if necessary, to incorporate therein various additives, for example, stabilizers, such as polimerization inhibitor, transparency preserving fillers, solvents and antioxidant; fluorescent whitening agent; and (reactive) oligomers and polymers of, such as polymethyl (meth)acrylate, polyurethane acrylate and polyester acrylate. The compounding proportion of these additives is appropriate.

It is preferable for the resin composition for hard coating according to the present invention not to contain fine powdery inorganic filler, such as fine silica powder. If a fine powdery inorganic filler is incorporated in the resin composition according to the present invention, the resistance to alkali becomes inferior.

The resin composition for hard coating according to the present invention is prepared by blending the essential components given above together with, if necessary, various additives, such as stabilizers etc., in a mixing or kneading device, such as an ordinary roller mixer, Bumbury mixer, ball mill, attritor, whipper, Oak's mixer, dissolver, homogenizer, colloid mill, sand mill, vibration mill, mixers and mixing agitation vessel, to build up a homogeneous solution or dispersion.

The coated product according to the present invention is a coated product in which a hard coat is formed from the resin composition for hard coating according to the present invention on the outer surface of a substrate of shaped or molded article.

As the substrate, voluntary shaped or molded articles of, for example, thermoplastic and thermosetting resins, metals and glass, may be employed, while molded articles of thermoplastic resins are particularly suitable. The geometry of the molded article may be in any voluntary form including film, sheet, plate and vessel.

For the thermoplastic resin to be used as the substrate that is coated with the resin composition according to the present invention, there may be exemplified polyolefines including homopolymers of α-olefines and copolymers with predominant proportion of an α-olefine comonomer, polyacrylates, polycarbonates, polyesters and polyamides. Among them, polyolefines, polyacrylates, polyesters and polycarbonates are preferred for the substrate of the coated product according to the present invention, wherein a particular preference is given to polyolefines and polyesters.

Examples of the polyolefine include homopolymers of α-olefins, such as ethylene, propylene, 1-butene, 1-hexene, 4-methyl-1-pentene, 1-octene and 1-decene; copolymers of two or more of such α-olefines; and copolymers made from a predominant proportion of such an α-olefine with a minor proportion (for example, below 30 mole %) of other comonomer(s) of, for example, a vinyl lower aliphatic carboxylate, such as vinyl acetate and vinyl propionate, and an ester or metal salt of acrylic or methacrylic acid, such as methyl acrylate, methyl methacrylate or a metal salt of acrylic or methacrylic acid. Among these polyolefines, those with crystallizability are used usually.

Examples of the polyacrylic ester resin includes homopolymers and copolymers of acrylic carboxylic acid ester monomers, such as methyl acrylate, ethylacrylate, methyl methacrylate and ethyl methacrylate. Among these polyacrylic carboxylic acid ester resins, polymethyl methacrylate is used preferably for the thermoplastic resin substrate to be coated with the resin composition according to the present invention.

For the polycarbonate resins, bisphenol A-polycarbonate may be exemplified.

As the polyester resins, there may be enumerated, for example, polyethylene terephthalate, polyethylene terephthalate naphthalate, polytetramethylene terephthalate, polyethylene terephthalate tsophthalate, copolycondensate of bisphenol A/isophthalic acid/terephthalic acid, polyethylene naphthalate and polycondensate of hydroxybenzoic acid.

As the polyamide resins, nylon 6, nylon 6,6, nylon 10 and nylon 12 may be exemplified.

Besides the resins mentioned above, many other resins may be employed for the substrate, for example, polyacetals, polystyrene, acrylonitrile/styrene copolymer, acrylonitrile/butadiene/styrene copolymer, polysulfones, polyphenyleneoxide, modified polyphenylene oxide, polyphenylene sulfide and polyethersulfone.

For the thermosetting resin to be used for the substrate coated with the resin composition according to the present invention, there may be exemplified unsaturated polyester resins, epoxy resins, diallyl phthalate resins and polyallyl glycol carbonate resin.

For the metallic substrate, aluminum, iron, stainless steels and so on may be exemplified.

On coating the surface of the substrate of, for example, a molded article of resin, with the resin composition for hard coating according to the present invention, the substrate may be subjected to various surface treatment procedures including cleaning with solvents, with an aqueous alkali solution, with surface active agents, with ultrasonic wave and by electrolysis; processing by blasting, such as sand blasting; etching with acid or alkali; flame treatment; electric discharge treatment by colona discharge, arc discharge, glow discharge and plasma discharge; and chemical conversion.

Upon the formation of the hard coat on the substrate of a molded article from the resin composition for hard coating according to the present invention, an intermediate layer consisting of a primer coating may be interposed between the substrate and the hard coat of the resin composition according to the present invention to build up a triple layer coating structure, in order to improve the adhesion of the hard coat according to the present invention onto the substrate. As a primer coating for a substrate of a polyolefine, usually a modified polyolefine, in which an α, β-unsaturated carboxylic acid or a derivative thereof, such as anhydride or ester, is grafted onto a basal polyolefine, is used.

By coating a substrate of a molded article, which may occasionally be subjected to a surface treatment or provided preliminarily with a primer coating, with the resin composition for hard coating according to the present invention and curing the resulting coating layer, a hard coat is buid up on the substrate, whereby the contemplated coated product is obtained.

For coating the substrate surface with the resin composition according to the present invention, known techniques including brush coating, spray coating, dipping, bar coating and coating with roller coater, spin-coater and gel-coater can be employed.

For effecting drying of the coated layer, natural drying, forced drying with a carrier gas and heat drying in an infrared or far infrared drying furnace or in a hot-blast furnace may be exemplified.

For converting the so-coated film of the resin composition according to the present invention into a hard coat, an active ray is used, wherein the film-forming component is caused to polymerize with cross linking by a light, especially by an ultraviolet light. In this light curing, usually a light irradiation at a temperature of −10° to +150° C., preferably 5° to 130° C. and most preferably 10° to 80° C. is carried out. The duration of the light irradiation is usually from one second to one hour, preferably from one second to 10 minutes.

The coated product having on the substrate a hard coat made from the resin composition for hard coating according to the present invention finds many applications. Concrete examples therefor include light collecting window panel, sky dome, light-receiving panel for sun light water heater, insulation panel for glove box, face glasses for clock and watch, lenses for, such as eyeglasses, contact lens and camera, optical prisms, blood bag, sewer dome, funnel and water pot for coffee percolator set, cover plates for illuminators, cover plates for audio apparatuses, such as record players, dial plates and covers for gage indicators, covers for headlight and taillight of automobile, level sensor, various films, such as fragmentation-preventing film for glass plate, mold releasing film, insulator film and agricultural films, video disc for light-reproduction, inspection window panel for various instruments, such as apparel dryer, electric laundry machine, laundry dryer and oil tanks, windshield of, such as autocycle, jeep and motorboat, glass plates of automobile, such as windshield, rear window, side window, triangular window and sunroof window, window glasses for, such as house, greenhouse and water tank, mirrors, tablewares, various vessels of, such as bottles for condiments and dressings, containers of cosmetics, bottles of drinks and wines and various returnable bottles, casings for relays and fusebox, parts of bicycle, such as side cover and mudguard, fender board, curtains, screens, tablecloths, water and moisture-preventing film, waterproof sheet, insulation film, floor tile, floor sheet, door, table plate, wall tile, smooth board on counter top, shelf board, wall sheet, wall paper, furnitures, light-weighing wall board, chair board, bathtub, stool, refrigerator box, wall panel, water supply and sewage pipes, electric service line conduit, ducts, curtain rod, rain gutter, heat insulator pieces, waterproof material for coating films, tent, window frame, parts of automobile, such as wheels and interior installations, dressing table, flower box, particle board, roofing tile, shielding door, shutter, waterproof pan, pipes, wire covering, cam elements for gears, finger pieces, frame of solenoid valve, fan blade, instrument panel, bumper piece and brake elements.

The coated product according to the present invention can include various other applications, in addition to those exemplified above, including other parts for, such as automobile, motorcycle, household electric products of manufacture and automatic vending machines, materials for architecture and construction, general industrial materials, office information devices and instruments, accessories for electronic devices, packaging materials, sports goods, medical instruments and parts for nueclear engineering.

The surface-coated vessel according to the present invention is produced such that a hard coating layer covers the outer surface of a vessel made of polyester resin.

As the resin based on polyester, there may be exemplified polyethylene terephthalate, polytetramethylene terephthalate and polyethylene naphthalate, wherein those made predominantly of polyethylene terephthalate or of polyethylene naphthalate are preferred. The resin made predominantly of polyethylene terephthalate is a polyester resin obtained from raw materials composed predominantly of ethylene glycol and terephthalic acid with addition of, if necessary, other diol component(s), such as trimethylene glycol, tetramethylene glycol, hexamethylene glycol, bisphenol A, hydroquinone and resorcine, and other dicarboxylic acid component(s), such as isophthalic acid, naphthalene dicarboxylic acid, 4,4-diphenoxyethane dicarboxylic acid, adipic acid, sebacic acid and cyclohexane dicarboxylic acid.

The resin made predominantly of polyethylene naphthalate is a polyester resin obtained from raw materials composed predominantly of 2,6-naphthalene dicarboxylic acid and ethylene glycol with addition of, if necessary, other diol component(s), such as trimethylene glycol, tetramethylene glycol, hexamethylene glycol, bisphenol A, hydroquinone and resorcine, and other dicarboxylic acid component(s), such as isophthalic acid, naphthalene dicarboxylic acid, 4,4-diphenoxyethane dicarboxylic acid, adipic acid, sebacic acid and cyclohexane dicarboxylic acid.

Such a resin based on polyester, especially that made predominantly of polyethylene terephthalate exhibits better applicability with the resin composition for hard coating according to the present invention and can be a surface-coated vessel having a good adhesion.

The surface-coated vessel may be of any voluntary shape, such as a cup, wherein it may preferably be a returnable bottle permissible of being collected and reused. The vessel may be produced by any voluntary molding technique, including blow molding, vacuum molding and compressed air molding. The vessel can be used as a throwaway vessel, while it may preferably be used as a returnable vessel, such as a returnable bottle, since it is provided with a hard coat excellent in the coating characteristics, such as surface hardness, resistance to alkali and weather resistance that can withstand the conditions upon its collection, reclamative processing of washing and reuse.

The hard coat of the resin composition according to the present invention formed on the outer surface of the surface-coated vessel of a resin based on polyester according to the present invention may preferably has a thickness in the range from 0.5 to 50 µm, preferably from 3 to 30 µm. Since the adhesion of the hard coat of the resin composition for hard coating according to the present invention is superior, it can be formed directly on the substrate surface, while it is also possible to interpose, if necessary, an intermediate coating layer, such as a primer coating, between the layer of the hard coat and the substrate surface.

While there is no special limitation for the concrete technique of applying the resin composition for hard coating according to the present invention onto the outer surface of the substrate made of a resin based on polyester, it may be preferable to choose a technique comprising applying the resin composition onto the vessel of the resin based on polyester while rotating the vessel, drying the resulting coated layer at a temperature below the glass transition point of the substrate resin based on polyester while rotating the vessel and/or curing the coated layer by exposing it to an ultraviolet ray while rotating the vessel. This technique is described below in detail:

As a preliminary treatment prior to coating the substrate vessel with the resin composition according to the present invention, the vessel may be subjected to various surface treatment including washing with, for example, solvents, aqueous alkali solution and surfactant(s), or by electrolysis or ultrasonication; blasting treatment; sand blasting; etching treatment with an acid or an alkali; flame treatment; electric discharge treatment by, for example, corona discharge, arc discharge, glow discharge and plasma discharge; and chemical conversion treatment, wherein it may be sufficient in general, due to the superior compatibility of the coated layer of the resin composition according to the present invention with the substrate resin based on polyester, to carry out the pretreatment by washing with an aqueous alkali solution and/or with surfactant(s). After the pretreatment by washing, the vessel is dryed at a temperature below the glass transition point of the substrate resin based on polyester.

For coating the substrate vessel, the resin composition according to the present invention is applied onto the vessel while rotating the vessel so as to reach a thickness of 0.5 to 50 µm of the coating layer after drying thereof. For coating the outer surface of the vessel with the resin composition according to the present invention, known techniques can be employed, including brush coating, spray coating, dipping, bar coating and coating with, for example, roller coater, spin coater and gel coater. Such coating procedure is carried out also at a temperature below the glass transition point of the substrate resin based on polyester.

After the vessel has been coated with the resin composition according to the present invention, the resulting coated layer is subjected to drying at a temperature below the glass transition point of the substrate resin based on polyester while it is rotated. For drying the coated layer, there may be employed various techniques including natural drying, forced drying with a carrier gas and heat drying in, for example, an infrared drying furnace, far infrared drying furnace and hot blasting furnace.

After the drying of the coated layer, the resulting dry coating film is subjected to curing by exposing it to a UV-irradiation at a temperature below the glass transition point of the substrate resin based on polyester while rotating the vessel, so that each part of the vessel surface will receive a cumulative exposure intensity of average of 500 to 5,000 mJ/cm$^2$. If the average cumulative exposure intensity is less than 500 mJ/cm$^2$, the curing of the coating film will be insufficient, resulting in unqualifiable coating properties for resistance to flaw formation and for tight adhesion onto the substrate resin and, if the exposure intensity exceeds over the value 5,000 mJ/cm$^2$, the coated resin product, such as a bottle, becomes liable to undergo deterioration by UV-light. It is preferable to employ a UV-light source emitting UV-rays including a large proportion of a UV-ray of wave length of about 290 nm, wherein an air-cooled UV-light source is more preferable than water-cooled one.

The reason for restricting the processing temperature to a temperature below the glass transition point of the substrate resin based on polyester is to prevent any deformation of the substrate (e.g. vessel). The vessel is rotated during the process operation, in order to form the coating film as uniform as possible. If the rotation of the vessel is not incorporated, the coated layer of the resin composition according to the present invention may tend to drop down and cause non-uniform film thickness in the direction of rotation of the vessel. The rotation of the vessel is effected around a horizontal axis which is the central axis of the vessel.

The surface-coated vessel according to the present invention is used, for example, for storage and transportation of a drink or food. When such vessels are used as returnable bottles, the used-up bottles can be collected and subjected to reclamative processing procedures including an aqueous alkali washing and/or a surfactant washing, whereupon they can be used again as reclaimed bottle by charging it with fresh contents, such as a drink or food.

According to the present invention, due to the specific proportion of the essential components in the resin composition for hard coating, namely, a specific poly[(meth) acryloyloxyalkyl](iso)cyanurate, a specific poly(meth) acrylated polyoxyalkanepolyol, specific combination of photopolymerization initiators, a specific UV-absorbers and an organic solvent, the curing characteristics, such as the rate of curing, upon the curing of the coating layer in the air is excellent and the resulting hard coat exhibits superior coating properties, such as surface hardness, fastness to scratch and abrasion, flexibility, surface gloss, heat resistance, water resistance, resistance to alkali and solvents, weather resistance and tight adhesion onto the substrate, when such hard coat is formed from the resin composition for hard coating according to the present invention on a substrate product of, for example, a resin molded article.

Due to the provision of the substrate vessel of a resin based on polyester according to the present invention with a hard coat resulting from the resin composition mentioned above, the surface-coated vessel is superior in the surface hardness, resistance to scratch and abrasion, flexibility, surface gloss, heat resistance, water resistance, resistance to alkali and solvents, weather resistance and tight adhesion of the hard coat onto the substrate, as compared with those of the conventional surface-coated vessel, so that it can serve for a returnable vessel which is to be collected after it has been used up and reclamatively processed by, for example, washing, to reuse it.

Due to the coating procedure effected with rotation of the substrate vessel to be coated at a temperature below the glass transition point of the substrate resin, the substrate vessel can be coated with the resin composition for hard coating according to the present invention uniformly without causing any deformation of the substrate so as to build up a hard coat thereon with superior curing characteristic, such as the rate of curing, upon the curing of the coated film by the process for producing the surface-coated vessel according to the present invention, whereby surface-coated vessels such as described above can be produced efficiently.

THE BEST MODE FOR EMBODYING THE INVENTION

Below, the present invention will further be described concretely by way of examples and comparative examples. In the specification and Examples, the described evaluations are carried out by the following criteria, wherein the evaluations for the vessel are made for a flat cut specimen cut out from the vessel and flattened into a sheet:

1) Light Transmissibility:

Evaluated according to the norm of JIS K6714.

2) Tight Adhesion:

Evaluated according to the norm of JIS K5400-1979, wherein the assessment is made by the number of cut squares having survived adherently without having fallen down from the substrate per 100 cut squares cut off by 10×10 cut lines (×/100).

For the specimens cut off from the vessel, the coated layer on the specimen is cut in with a cutter knife up to a depth reaching the substrate by linear cut-in lines crossing at an angle of 60° and a cellophane tape is caused to adhere onto the so-cut-in specimen, whereupon the cellophane tape is pulled from the specimen strongly to a direction of an angle of 45° to the specimen face and the presence or absence of peeling off of the coated layer from the specimen is observed visually.

3) Tabar Abrasion

According to ASTM D-1044, an abrasion wheel of CS-10 is rotated on the coated film at a revolution rate of 1,000 rpm under a load of 500 g. The abrasiveness of the coating layer is assessed by the worn-off amount of the coating layer after the test. The smaller the worn-off amount of the coating layer, the more excellent is the resistance to abrasion.

4) Falling Sand Abrasion

According to JIS T8147-1975, 800 g of grit particles of a silicon carbide abrasive are caused to fall down onto the coating layer. The resistance to abrasion is indicated by the difference between the surface gloss values before and after the test. The smaller this difference, the better is the resistance to abrasion.

5) Pencil Hardness

Determined according to the procedures specified by JIS K5651.

6) Fastness to Alkali

After the specimen has been immersed in a 4 wt.-% aqueous NaOH solution at a temperature of 50° C. for 5 hours, the specimen is washed with water sufficiently, whereupon the surface condition of the hard coat of the specimen is inspected visually.

7) Weather Resistance

The specimen is held in a Sunshine weatherometer for 600 hours, whereupon the appearance and the tight adhesion of the hard coat onto the substrate are assessed.

In the following Examples and Comparative Examples, each compound employed is represented by the acronym given as follows:

TAEIC: tris(acryloyloxyethyl)isocyanurate

DPPH: dipentaerythritol hexaacrylate

MMPMP: 2-methyl-1-[4-(methylthio)phenyl]-2-morpholino-1-propanone

IHP: 1-(4-isopropylphenyl)-2-hydroxy-2-methyl-1-propanone

EXAMPLE 1

75 grams of TAEIC, 25 grams of DPPH, 1 gram of MMPMP, 0.25 gram of 2-chlorothioxanthone, 1 gram of 2-hydroxy-4-methoxybenzophenone and 0.0025 gram of a levelling agent BYK-344 (of BYK Chimie) were weighed and charged in a mixing tank equipped with a stirrer, whereto were added 63.5 grams of methylcyclohexane and 63.5 grams of methyl isobutyl ketone and the mixture was stirred for 2 hours after the temperature thereof had been elevated to 60° C. under a nitrogen atmosphere, whereupon the mixture was cooled to room temperature by standing, in order to prepare a coating composition (A) for hard coating.

Separately, an injection molded sheet having a thickness of 3 mm of poly-4-methyl-1-pentene (obtainable from Mitsui Petrochemical Ind., Ltd. with a trademark TPX MX004) was immersed in a solution of a maleic anhydride-modified EPR (an ethylene/propylene rubber with a maleic anhydride content of 7.7% by weight) in 1,1,1-trichloroethane of a concentration of 15 g of the former per liter of the latter for 10 seconds, whereupon the sheet was dried at room temperature for 5 minutes and was then subjected to a primer treatment. The resulting primer-treated TPX sheet was coated with the above coating composition (A) using an air spray gun so as to reach a dry coating film thickness of 18 μm, whereupon the coated layer was dried at 60° C. for 5 minutes before it was exposed to a UV-irradiation by a UV ray using an air-cooled UV-irradiator (Ushio K. K.) at an exposure intensity of 2,000 mJ/cm$^2$, in order to prepare a test specimen of a coated product in which the TPX surface was provided with a hard coat. The results of assessment of this test specimen are recited in Table 1 below.

Comparative Example 1

The procedures for preparing the coating composition (A) of Example 1 were repeated except that 75 g of TAEIC, 25 g of DPPH, 5 g of IHP, 63.5 g of methylcyclohexane and 63.5 g of methyl isobutyl ketone were weighed each and 33 g of a n-butanol silica sol (a 30 wt.-% suspension of anhydrous silica powder in n-butanol having an average particle size of about 16 nm and a refractive index of about 1.50, available from Nissan Chemical Ind., Ltd.) were added to the resulting mixture with agitation, in order to prepare a coating composition (B). Thereafter, test specimens were prepared in the same manner as in Example 1. The test results with these test specimens are recited in Table 1 below.

TABLE 1

| Tests for | Example 1 | Comp. Example 1 |
|---|---|---|
| Coating film thickness (μm) | 18 | 18 |
| Light transmissivity (%) | 92 | 92 |
| Tight adhesion (X/100) | 100 | 100 |
| Tabar abrasion (Δ mg) | 1 | 1 |
| Falling sand abrasion (Δ %) | 5 | 16 |
| Pencil hardness | F | HB |
| Resistence to alkali | no change | 1) |
| Weather resistance: | | |
| Appearance | no change | 2) |
| Tight Adhesion | 100 | 83 |

1): Coating layer was partly peeled off.
2): Colored into pale yellow.

EXAMPLE 2

A biaxially stretched polyester film having a thickness of 250 μm (with trademark Rumirer, of Toray Industries, Inc.) was washed sufficiently with water containing a small amount of a surfactant and was then dried at 50° C. for 5 minutes. This film was coated using an air spray gun with the coating composition (A) prepared in Example 1, so that the coating layer had a thickness of 20 μm after having been dried, whereupon the resulting coated film was dried at 60° C. for 5 minutes. The dried film was then exposed to a UV-irradiation by an air cooled UV-irradiator (of Ushio K. K.) at an irradiation intensity of 2,000 mJ/cm$^2$ to prepare a sample of a coated product of a polyester film having a hard coat thereon. The test results of the sample are recited in Table 2 below.

Comparative Example 2

The procedures of Example 2 were repeated to prepare a sample of a coated product except that the coating composition (B) prepared in Comparative Example 1 was employed in place of the coating composition (A) for coating the film, whereupon the tests were carried out in the same manner. The test results are recited in Table 2 below.

TABLE 2

| Tests for | Example 2 | Comp. Example 2 |
|---|---|---|
| Coating film thickness (μm) | 20 | 20 |
| Light transmissivity (%) | 92 | 92 |
| Tight Adhesion (X/100) | 100 | 100 |
| Tabar Abrasion (Δ mg) | 1 | 1 |
| Falling sand abrasion (Δ %) | 6 | 15 |
| Pencil hardness | 4 H | 2 H |
| Resistance to alkali | no change | 1) |
| Weather resistance: | | |
| Appearance | no change | 2) |
| Tight Adhesion | 99 | 10 |

1): Coating layer was peeled off completely.
2): Colored into pale yellow.

EXAMPLE 3

The procedures of Example 1 were repeated except that the amounts of TAEIC and DPPH were changed to 20 g and 80 g, respectively, to prepare a coating composition (C).

On the other hand, a hard glass plate was dipped in a solution of a modified EPR (a modified ethylene/propylene rubber having a methylated maleic anhydride content of 4.5% by weight), which was modified by a compound in which a part of maleic anhydride corresponding to one carboxyl group is esterified with methanol, in 1,1,1-trichloroethane at a concentration of 15 g/l for 10 seconds, whereupon the so-dipped plate was dried at room temperature for 5 minutes, before it was subjected to a primer treatment. This primer-treated hard glass plate was coated with the above coating composition (C) using an air spray gun, so that the coating layer had a thickness of 12 μm after it was dried. Then, the procedures of Example 1 were followed to prepare test specimens. The results of assessments of the test specimens are recited in Table 3 below.

EXAMPLE 4

The procedures of Example 1 were repeated with the exception that 150 g of methyl isobutyl ketone were used in the place of methylcyclohexane and 20 g of an aliphatic polyester resin (with trade name Bilon 300, Toyobo Co., Ltd., having a number average molecular weight of 25,000) were incorporated additionally, to prepare a coating composition (D). The biaxially stretched polyester film employed in Example 2 was dipped in this coating composition (D) and was then drawn up gradually, whereupon it was processed by following the procedures of Example 2, in order to prepare test specimens having a coating thickness after drying of 8 μm. The result of assessments of the test speciment are recited in Table 3 below.

TABLE 3

| Tests for | Example 3 | Example 4 |
|---|---|---|
| Coating film thickness (μm) | 12 | 8 |
| Light transmissivity (%) | 90 | 91 |
| Tight adhesion (X/100) | 100 | 100 |
| Tabar abrasion (Δ mg) | 1 | 2 |
| Falling sand abrasion (Δ %) | 3 | 5 |
| Pencil hardness | 8 H | 3 H |
| Resistance to alkali | no change | no change |
| Weather resistance: | | |
| Appearance | no change | no change |
| Tight Adhesion | 100 | 100 |

EXAMPLE 5

A biaxially stretched bottle of polyethylene terephthalate having a diameter of 100 mm and a wall thickness of 2–3 mm was washed sufficiently with water containing small amount of a surfactant and was then dried at 50° C. for 5 minutes. This washed and dried biaxially stretched bottle was then coated with the coating composition (A) prepared in Example 1 using an air spray gun while rotating the bottle around a horizontal axis of rotation at a revolution rate of 20 rpm, so that a coating layer thickness of 18 μm was reached after drying the coating layer, whereupon the coating layer was subjected to drying at a temperature of 60° C. for 5 minutes. The dried coating layer was then exposed to a UV-irradiation by an air cooled UV-irradiator (of Ushio K. K.) at an irradiation intensity of 2,000 mJ/cm$^2$ to prepare test specimens from a coated product of a biaxially stretched bottle having a hard coat thereon. The test results of the specimens are recited in Table 4 below.

Comparative Example 3

The procedures of Example 5 were repeated to obtain test specimens from a coated bottle except that the coating composition (B) prepared in Comparative Example 1 was employed in place of the coating composition (A) for coating the bottle, whereupon test specimens were prepared as in Example 5 and the tests were carried out in the same manner. The test results are recited in Table 4 below.

TABLE 4

| Tests for | Example 5 | Comp. Example 3 |
|---|---|---|
| Coating film thickness (μm) | 18 | 18 |
| Light transmissivity (%) | 92 | 92 |
| Tight adhesion (X/100) | never peeled off | never peeled off |
| Falling sand abrasion (Δ %) | 6 | 15 |
| Pencil hardness | 4 H | 2 H |
| Resistance to alkali | no change | 1) |
| Weather resistance: | | |
| Appearance | no change | 2) |
| Tight Adhesion | never peeled off | never peeled off |

1): Coating layer was peeled off completely.
2): Colored into pale yellow.

EXAMPLES 6 to 8

The procedures of Example 5 were repeated to obtain test specimens from a biaxially stretched bottle molded using the starting material given below instead of using the biaxially stretched bottle made of polyethylene terephthalate, by coating it with the coating composition (A) so that the coating layer had a thickness as given in Table 5. The results of assessments for these specimens are recited in Table 5 below.

| Starting Material | |
|---|---|
| Example 6 | Copolymer of 10 mole % of isophthalic acid with polyethylene terephthalate |
| Example 7 | Copolymer of 5 mole % of cyclohexanedimethanol with polyethylene terephthalate |
| Example 8 | Polyethylene naphthalate |

TABLE 5

| Tests for | Example 6 | Example 7 | Example 8 |
|---|---|---|---|
| Coating film thickness (μm) | 8 | 12 | 10 |
| Light transmissivity (%) | 92 | 92 | 80 |
| Tight adhesion (X/100) | 100 | 100 | 100 |
| Tabar abrasion (Δ mg) | 7 | 6 | 4 |
| Falling sand abrasion (Δ %) | 5 | 6 | 8 |
| Pencil hardness | 4 H | 4 H | 5 H |
| Resist. to alkali | no change | no change | no change |
| Weather resistance | | | |
| Appearance | no change | no change | no change |
| Tight Adhesion | 100 | 100 | 98 |

We claim:

1. A surface-coated vessel in which a hard coating layer improved in surface hardness, wear resistance, alkali resistance and weather resistance is formed over the outer surface of a vessel made of a resin based on polyester, said coating layer being obtained from a resin composition which comprises (a) a poly((meth)acryloyloxyalkyl) (iso)cyanurate represented by the following general formula (1) or (2):

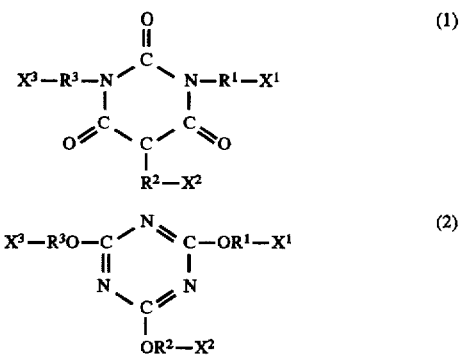

wherein $X^1$, $X^2$ and $X^3$ are each an acryloyl group, methacryloyl group, hydrogen atom or an alkyl group, with a proviso that at least two of them are (meth)acryloyl groups, and $R^1$, $R^2$ and $R^3$ are each an oxyalkylene group or a polyoxyalkylene group;

(b) a poly(meth)acrylated polyoxyalkane polyol having in the molecule at least one ether bond and at least three hydroxy groups, in the range from 5 to 300 parts per 100 parts by weight of said component (a);

(c) a photopolymerization initiator consisting of 2-methyl-1-(4-(methylthio)phenyl)-2-morpholino-1-propanone in the range from 0.01 to 20 parts per 100 parts by weight of the sum of the above two components (a) and (b);

(d) a photopolymerization initiator based on thioxanthone in the range from 0.001 to 5 parts per 100 parts by weight of the sum of the components (a) and (b);

(e) a UV-absorber based on monohydroxybenzophenone in the range from 0.01 to 20 parts per 100 parts by weight of the sum of the components (a) and (b); and (f) an organic solvent in the range from 5 to 2,000 parts per 100 parts by weight of the sum of the components (a) and (b).

2. A surface-coated vessel according to claim 1, wherein the resin based on polyester consists essentially of polyethylene terephthalate.

3. A surface-coated vessel according to claim 1 or 2, wherein the vessel is a returnable bottle.

4. A process for producing a surface-coated vessel improved in surface hardness, wear resistance, alkali resistance and weather resistance comprising the process step of coating the outer surface of a vessel made of a resin based on polyester with a resin composition for hard coating which comprises (a) a poly((meth)acryloyloxyalkyl) (iso)cyanurate represented by the following general formula (1) or (2):

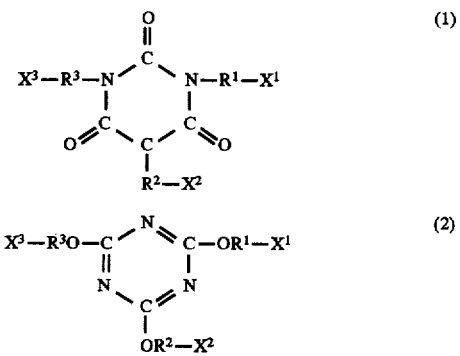

wherein $X^1$, $X^2$ and $X^3$ are each an acryloyl group, methacryloyl group, hydrogen atom or an alkyl group, with a proviso that at least two of them are (meth)acryloyl groups, and $R^1$, $R^2$ and $R^3$ are each an oxyalkylene group or a polyoxyalkylene group;

(b) a poly(meth)acrylated polyoxyalkane polyol having in the molecule at least one ether bond and at least three hydroxy groups, in the range from 5 to 300 parts per 100 parts by weight of said component (a);

(c) a photopolymerization initiator consisting of 2-methyl-1-(4-(methylthio)phenyl)-2-morpholino-1-propanone in the range from 0.01 to 20 parts per 100 parts by weight of the sum of the above two components (a) and (b);

(d) a photopolymerization initiator based on thioxanthone in the range from 0.001 to 5 parts per 100 parts by weight of the sum of the components (a) and (b);

(e) a UV-absorber based on monohydroxybenzophenone in the range from 0.01 to 20 parts per 100 parts by weight of the sum of the components (a) and (b); and (f) an organic solvent in the range from 5 to 2,000 parts per 100 parts by weight of the sum of the components (a) and (b).

5. A process according to claim 4, wherein the vessel is coated with the resin composition so as to reach a coating layer thickness of 0.5–50 μm.

6. A process according to claim 4 or 5, wherein a UV-exposure is incorporated so as to reach a cumulative exposure intensity of 500–5,000 mJ/cm$^2$.

7. A process according to claim 4 or 5, wherein the coating step comprises applying the resin composition onto the outer surface of the vessel while rotating the vessel.

8. A process according to claim 4 or 5, wherein it comprises a further step of drying the coating layer at a temperature below the glass transition temperature of the polyester resin while rotating the vessel.

9. A process according to claim 4 or 5, wherein it comprises a further step of forming a hard coat by hardening the coating layer by irradiating the coating layer with a UV ray while rotating the vessel.

10. A process according to claim 4 or 5, wherein the coating step comprises applying the resin composition onto the outer surface of the vessel while rotating the vessel around a horizontal axis.

11. A process according to claim 4 or 5, which comprises a further step of drying the coating layer at a temperature below the glass transition temperature of the polyester resin while rotating the vessel around a horizontal axis.

12. A process according to claim 4 or 5, which comprises a further step of forming a hard coat by hardening the coating layer by irradiating the coating layer with a UV ray while rotating the vessel around a horizontal axis.

* * * * *